United States Patent [19]

Larson

[11] Patent Number: 5,608,794

[45] Date of Patent: Mar. 4, 1997

[54] TELEPHONE HEADSET IN-USE INDICATOR

[76] Inventor: Dana Larson, 5288 SE. El Centro Way, Milwaukie, Oreg. 97267

[21] Appl. No.: 511,475

[22] Filed: Aug. 4, 1995

[51] Int. Cl.$^6$ .................................................. H04M 1/05
[52] U.S. Cl. ........................ 379/396; 379/377; 379/387; 379/430
[58] Field of Search .................................. 379/447, 450, 379/441, 442, 443, 387, 395, 396, 377, 430, 428, 376, 164; 381/183, 187

[56] References Cited

U.S. PATENT DOCUMENTS

| | | | |
|---|---|---|---|
| 3,951,248 | 4/1976 | Feiner et al. | 379/396 X |
| 4,558,178 | 12/1985 | Yasuda et al. | 379/430 X |
| 5,210,791 | 5/1993 | Krasik | 379/377 |
| 5,359,647 | 10/1994 | Regen et al. | 379/377 X |
| 5,422,947 | 6/1995 | Azem | 379/396 |

FOREIGN PATENT DOCUMENTS 2154392  9/1985  United Kingdom ................. 379/396

Primary Examiner—Ahmad F. Matar
Assistant Examiner—T. Devendra Kumar
Attorney, Agent, or Firm—Marger, Johnson, et al.

[57] ABSTRACT

An indicator lamp identifies the status of telephone calls both transmitted and received from a hands-free telephone headset. The indicator lamp is either automatically activated by a signal from a telephone line or manually activated by a switch. Manual activation provides an additional means for the operator to prevent interruptions regardless of telephone status. The indicator lamp is located at various locations on the headset next to the mouthpiece or, alternatively, along the entire length of the headset arm.

7 Claims, 2 Drawing Sheets

TELEPHONE HEADSET IN-USE INDICATOR

BACKGROUND OF THE INVENTION

This invention relates generally to telephone headsets which attach hands-free onto the head of an operator and, more particularly, to a lamp attached to the headset that provides a visual indication as to whether the operator is currently processing a telephone call or not.

Operator headsets allow a telephone operator to process telephone calls in a "hands-free" manner. The headset clamps onto the telephone operator's head so that the operator's hands are free to perform other activities. For example, the operator can enter data into a computer terminal while at the same time fielding telephone calls through the telephone headset.

While providing more freedom for the operator to perform other tasks, telephone headsets create problems for others attempting to communicate directly to the operator. For example, others within physical proximity of the operator do not know whether the operator is currently talking or listening to someone on the telephone. Thus, a phone call may be inadvertently interrupted by direct verbal communication. The operator must then either interrupt the person attempting to communicate directly or interrupt the telephone communication.

If the operator is wearing the headset, persons may forgo direct communication thinking that the operator is in the middle of a telephone conversation.

Many telephone sets provide a visual indicator. The visual indicator identifies the activation state of the telephone line, but does not indicate whether the headset operator is currently engaged in a telephone call.

Because visual indicators are also located next to the telephone console, it is not readily apparent from simply looking at the operator whether the headset is turned on. For example, the operator's phone console and the visual indicator may be hidden behind articles on the operator's desk.

Thus, a need remains for identifying the activation status for telephones with hand-free headsets.

SUMMARY OF THE INVENTION

An indicator lamp is attached directly onto a telephone headset providing a visual indication of the headset operator's communication status. The headset includes an earpiece and a mouthpiece connected together by an elongated arm. A lamp attached on the headset provides visual indication of the operator's phone status.

In one embodiment of the invention, the lamp is located directly next to the mouthpiece. Thus, anyone who looks at the face of the operator can also see the lamp indicating the operator's telephone communication status. In a second embodiment of the invention, the lamp is located through the entire headset arm so that telephone status can be seen while viewing the operator from either the back, side or front.

The headset includes a control circuit that selectively switches between either a manual or automatic mode. In the manual mode, the operator activates a switch that activates the indicator lamp independently of phone connection status. Thus, the operator can selectively notify others not to interrupt. In the automatic mode, the lamp automatically turns ON whenever a phone connection is in the "OFF HOOK" mode between two ends of a telephone line. Alternatively, the lamp is voice-activated by the operator. Thus, the operator can control lamp activation in a hands-free manner.

Thus, locating a lamp on the telephone headset prevents the operator of the headset from being interrupted during telephone calls and further allows selective broadcasting of the operator's availability for participation in direct verbal communication.

The foregoing and other objects, features and advantages of the invention will become more readily apparent from the following detailed description of a preferred embodiment of the invention which proceeds with reference to the accompanying drawings.

DETAILED DESCRIPTION

Figure 1:
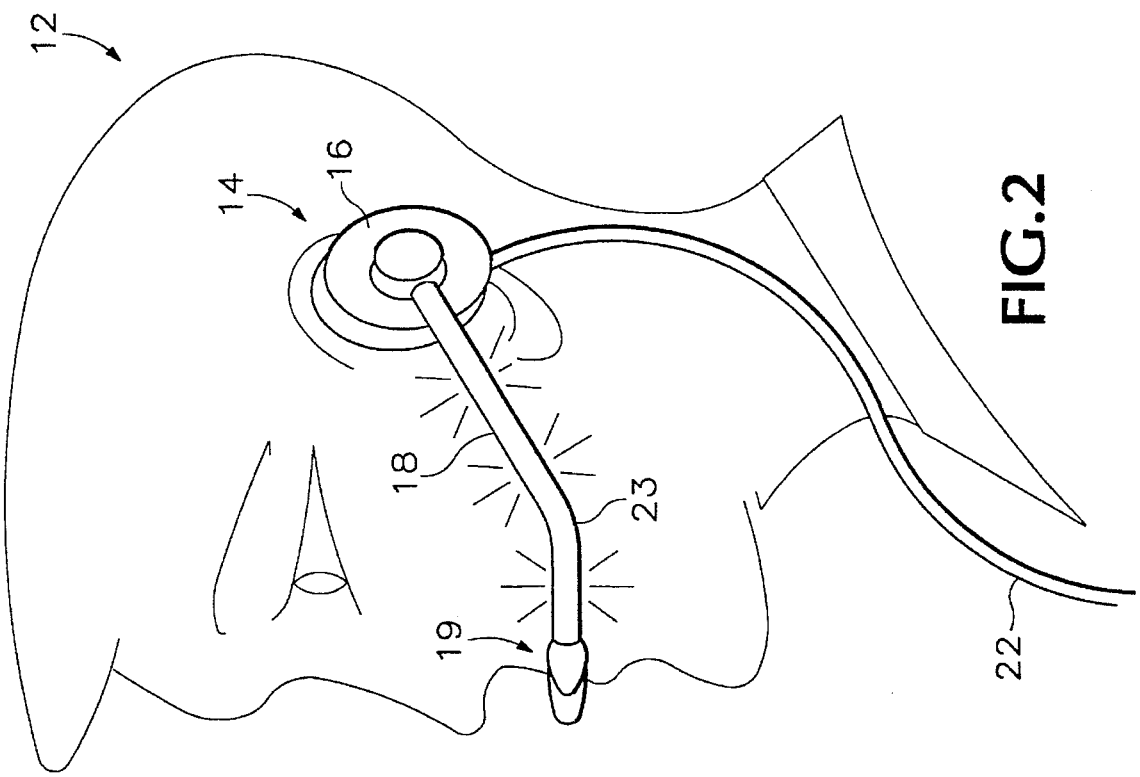
FIG. 1 is a diagram of a telephone headset according to the invention.

FIG. 1 is a schematic diagram showing a headset 14 attached to the head of an operator 12. The headset includes an earpiece 16 and a mouthpiece 19 attached by an arm 18. The headset is connected to a telephone console (not shown) through a cable 22.

The headset can have different configurations for hands-free attachment onto the head of the operator 12. For example, a support brace (not shown) can extend from the earpiece 16 over the top of the operator's head for additional support.

Alternatively, the earpiece 16 is inserted into the ear of the operator as shown in FIG. 1, securely supporting the headset 14 on the operator's head. Headsets and the circuitry for connecting the headset to a telephone console are, in general, well known and therefore will not be described in detail.

A busy indicator lamp 20 indicates phone status to anyone in direct visual contact with the operator. Typically, anyone wishing to make direct verbal contact with the operator directs their field of vision toward the face of operator 12. Thus, by locating lamp 20 next to the mouthpiece of the headset 14, anyone attempting to directly communicate with operator 12 will also see the communication status of the telephone system. It is understood that the lamp 20 can be located anywhere in the headset.

Figure 2:
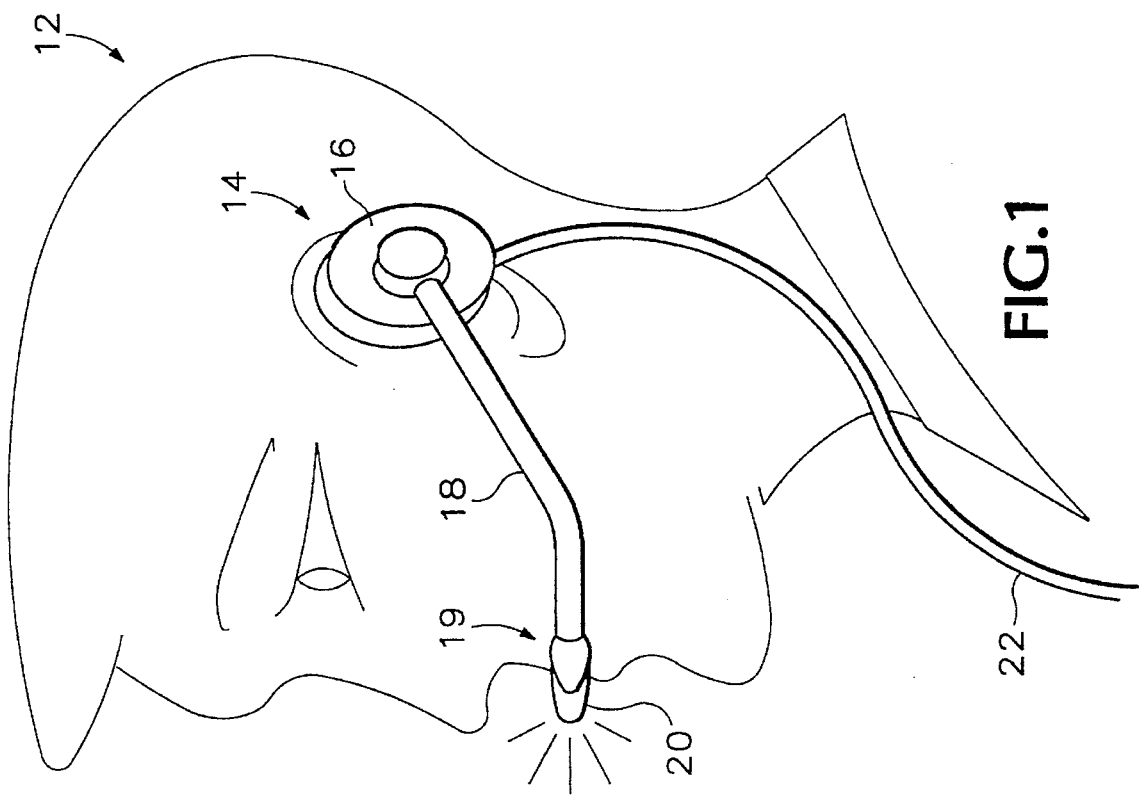
FIG. 2 is a telephone headset with a busy indicator lamp extending through the entire headset arm.

For example, FIG. 2 shows an alternative embodiment of the invention comprising a busy indicator lamp 23 located through the entire arm 18 of the headset 14. Since the arm 18 extends along the side and across the front of the operator's head, the indicator lamp 23 is seen by others positioned either to the side or in back of the operator. The extended illumination area provided by indicator lamp 23 prevents the operator from being interrupted by others approaching the operator from any direction.

As stated above, any kind of illumination device may be used for indicating phone busy status. For example, busy indicator lamps in FIGS. 1 and 2 can use light-emitting diodes (LED's), neon lights, incandescent lights or fluorescent lights. Also, different colored lights or colored containers may be used for various aesthetic reasons.

Figure 3:
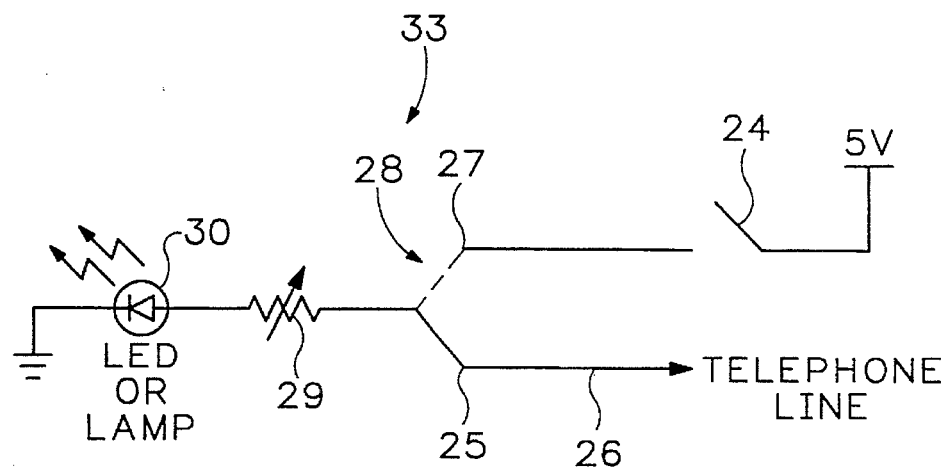
FIG. 3 is a circuit diagram showing a control circuit for the headset previously shown in FIG. 1.

FIG. 3 shows one example of a schematic diagram of a general control circuit 33 used for controlling the indicator lamp shown in FIGS. 1 and 2. It is understood that alternative circuit configuration could be implemented. A manual control circuit comprises a switch 24 coupled between a 5 volt power supply and a control switch 28. An automatic control circuit comprises a telephone line 26 coupled directly to control switch 28. Switch 28 is connected through a variable resistor 29 to a light-emitting diode (LED) 30. The LED 30 is located on headset 14 (FIGS. 1 and 2).

To operate the system in a manual mode, switch 28 is connected to a terminal 27. The operator 12 (FIG. 1) then manually couples or decouples the 5 volt power supply through switch 24 to LED 30. In the manual mode, the operator has the option of turning on the indicator lamp independently of whether the operator is conducting a telephone conversation.

During manual operation, switch 24 can be used to switch on the indicator lamp 20 (FIG. 1) even when the operator is not conducting a telephone conversation. Thus, the indicator lamp allows the operator to display a "do not disturb" signal to others working in the same area.

In the automatic mode, switch 28 is connected to terminal 25 coupling the telephone line directly to diode 30. LED 30 is then activated only when a connection is made through telephone line 26 to another telephone. Variable resistor 29 allows the operator to select different light intensity levels for the indicator lamp.

The busy indicator lamp can be turned ON through voice activation whereby the operator upon speaking into the mouthpiece 19 activates the LED 30 for a predetermined period of time. Voice activation is well known to those in the art and therefore is not described in detail.

Figure 4:
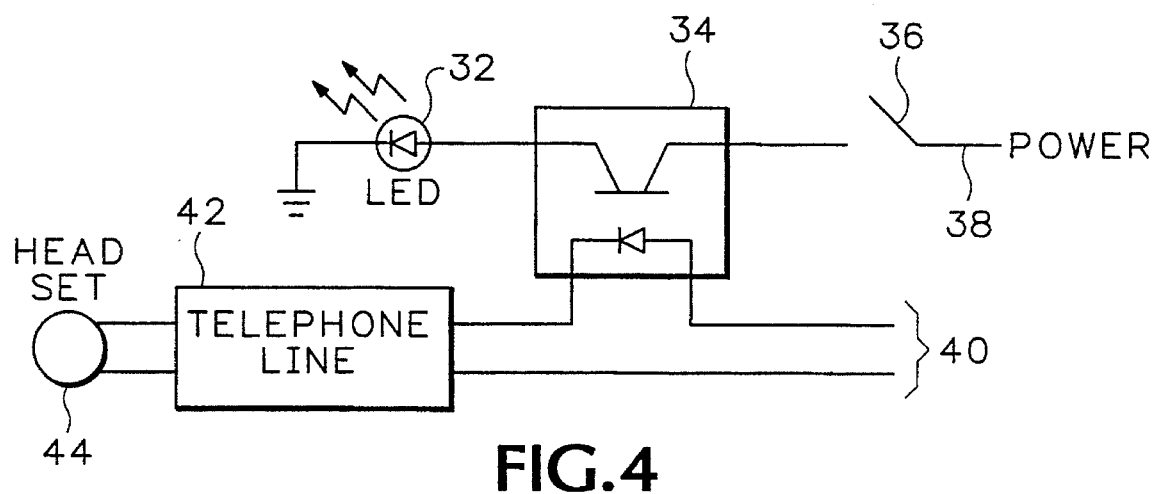
FIG. 4 is another embodiment of a control circuit for the headset previously shown in FIG. 1.

FIG. 4 is another embodiment of a control circuit for the headset shown in FIG. 1. A telephone line 40 is coupled through an opto-isolator 34 to a telephone set 42. The telephone set 42 is coupled to a headset 44. The opto-isolator 34 selectively coupled power from line 38 through a switch 36 to an LED or lamp 32 located in the telephone headset shown in FIG. 1.

When telephone lines 40 are active, opto-isolator 34 connects power from line 38 to LED 32 illuminating the headset 14 (FIG. 1). When the telephone lines 40 are disconnected from another telephone set, the LED 32 is deactivated. The LED 32 is selectively enabled or disabled with switch 36.

The modulator circuit shown in FIG. 4 monitors speech signals from telephone lines 40 and, in turn, activates LED 32 when the operator on either end of the telephone line 40 is talking. The modulation signal from telephone lines 40 may also be inversely proportional to the voice signal intensity. Thus, LED 32 will be full ON when no speech signals are present on telephone lines 40 and fully OFF when the operator is currently talking.

The invention provides an easy, low-cost means for indicating communication status for operators using telephone headsets.

Having described and illustrated the principles of the invention in a preferred embodiment thereof, it should be apparent that the invention can be modified in arrangement and detail without departing from such principles. I claim all modifications and variations coming within the spirit and scope of the following claims.

What is claimed is:

1. A system for visually indicating call status on a telephone, comprising:

a headset coupled to the telephone for receiving and sending voice communications, the headset held handsfree onto the head of an operator;

a control circuit for switching between a manual activation circuit and an automatic activation circuit, the automatic activation circuit generating an activation signal according to a communication status of the telephone and the manual activation circuit generating the activation signal independently of the communication status of the telephone; and a visual indicator attached to the headset that activates according to the activation signal from the control circuit.

2. A system according to claim 1 wherein the manual activation circuit comprises a switch that selectively turns the visual indicator ON and OFF.

3. A telephone system according to claim 1 wherein the automatic activation circuit is coupled between the telephone and the visual indicator, the automatic activation circuit automatically activating the visual indicator according to a signal from the telephone indicating connection to another telephone.

4. A telephone system for visually indicating call status on a telephone, comprising:

a headset coupled to the telephone for receiving and sending voice communications, the headset held handsfree onto the head of an operator;

a visual indicator attached to the headset that indicates that the operator is conducting telephone calls on said headset; and a voice activation circuit coupled to the visual indicator for activating and deactivating the visual indicator according to voice signals from the operator.

5. A method for visually identifying operator communication through a telephone headset, comprising:

providing a telephone headset coupled to a telephone that transmits and receives telephone calls;

attaching the telephone headset onto the operator's head;

illuminating at least a portion of the telephone headset when the operator is communicating through said telephone headset;

automatically illuminating the telephone headset according to an activation signal from the telephone; and changing from automatically illuminating the telephone headset to manually illuminating the telephone headset independently of the communication status of the telephone headset.

6. A method for visually identifying operator communication through a telephone headset, comprising:

providing a telephone headset coupled to a telephone that transmits and receives telephone calls;

attaching the headset onto the operator's head;

illuminating at least a portion of the headset when the operator is communicating through said telephone headset; and varying a given intensity of illumination for the headset.

7. A system for visually indicating call status on a telephone, comprising:

a headset coupled to the telephone for receiving and sending voice communications, the headset held handsfree onto the head of an operator;

a visual indicator attached to the headset that indicates that the operator is conducting telephone calls on said headset; and a manual activation circuit comprising a switch that selectively turns the visual indicator ON and OFF independently of the communication status of the telephone.

\* \* \* \* \*